United States Patent [19]

Schoen

[11] 4,345,923

[45] Aug. 24, 1982

[54] AIR PURIFIER WITH HERMETIC SEALING

[75] Inventor: Donald W. Schoen, St. Paul, Minn.

[73] Assignee: Donaldson Company, Inc., Minneapolis, Minn.

[21] Appl. No.: 250,893

[22] Filed: Apr. 3, 1981

[51] Int. Cl.³ .................... B01D 46/44; B01D 50/00
[52] U.S. Cl. ....................................... 55/314; 55/309; 55/316; 55/387
[58] Field of Search ............... 55/314, 313, 312, 316, 55/387, 420, DIG. 33, DIG. 9, 309

[56] References Cited

U.S. PATENT DOCUMENTS

| | | | |
|---|---|---|---|
| 827,643 | 7/1906 | Lawrence | 55/314 X |
| 2,334,561 | 11/1943 | Kopplin | 55/312 X |
| 2,486,472 | 11/1949 | Harris | 55/387 X |
| 2,600,435 | 6/1952 | Shapiro . | |
| 2,640,558 | 6/1953 | Dauphinee . | |
| 3,000,506 | 9/1961 | Hultgren . | |
| 3,086,342 | 4/1963 | Goettl . | |
| 3,139,020 | 6/1964 | Schemenauer . | |
| 3,384,976 | 5/1968 | Westeren | 55/387 X |
| 3,643,833 | 2/1972 | Fraze et al. . | |
| 3,670,919 | 6/1972 | Prayer et al. . | |
| 3,773,209 | 11/1973 | Schane . | |
| 3,967,754 | 7/1976 | Ostrem . | |
| 4,044,915 | 8/1977 | LaCroce et al. . | |
| 4,133,659 | 1/1979 | Beckman . | |
| 4,247,315 | 1/1981 | Neumann | 55/DIG. 9 X |

OTHER PUBLICATIONS

*The Condensed Chemical Dictionary,* 8th ed., New York, Reinhold, 1971, p. 19.

*Primary Examiner*—Kathleen J. Prunner

*Attorney, Agent, or Firm*—Merchant, Gould, Smith, Edell, Welter & Schmidt

[57] ABSTRACT

The invention is an air purifying apparatus having an air inlet plenum (22, 140) mounted to a filter canister (21) and containing a bypass (63, 157). A barrier (52, 147) divides the inlet plenum (22, 140) into an inlet chamber (53, 150) and an outlet chamber (54, 151). In one embodiment the bypass is formed as a box (63) attached to the plenum (22) and containing openings (70, 71) which communicate respectively with the inlet chamber (53) and the outlet chamber (54) to define a bypass flow path from the inlet chamber (53), through the box (63) and into the outlet chamber (54). In another embodiment the bypass is formed as an opening (157) in the barrier (147) to allow direct communication between the inlet (150) and outlet (151) chambers. The filter canister (21) containing filters (91, 94) is normally hermetically sealed and is mounted to the plenum (22, 140) to allow air flow from the inlet chamber (53, 150), through the filters (91, 94) and into the outlet chamber (54, 151) when the hermetic seal is destroyed and the bypass flow path is occluded. Actuators (125, 126 or 155, 156) in the plenum (22, 140) are operably connected to closures (100, 101) on the filter canister (21). In a first position, the actuators (125, 126 or 155, 156) maintain the hermetically sealed condition of the filter canister (21). In a second position the actuators (125, 126 or 155, 156) destroy the hermetic seal by removing the closures (100, 101) and create an alternate air flow path through the filters (91, 94). The bypass flow path is occluded upon activation of the actuators either by inversion of the box (63) to close its openings (70, 71) or by valves (161, 162) which are carried on the actuators (155, 156) and which close the bypass opening (157) upon removal of the closures (100, 101).

12 Claims, 9 Drawing Figures

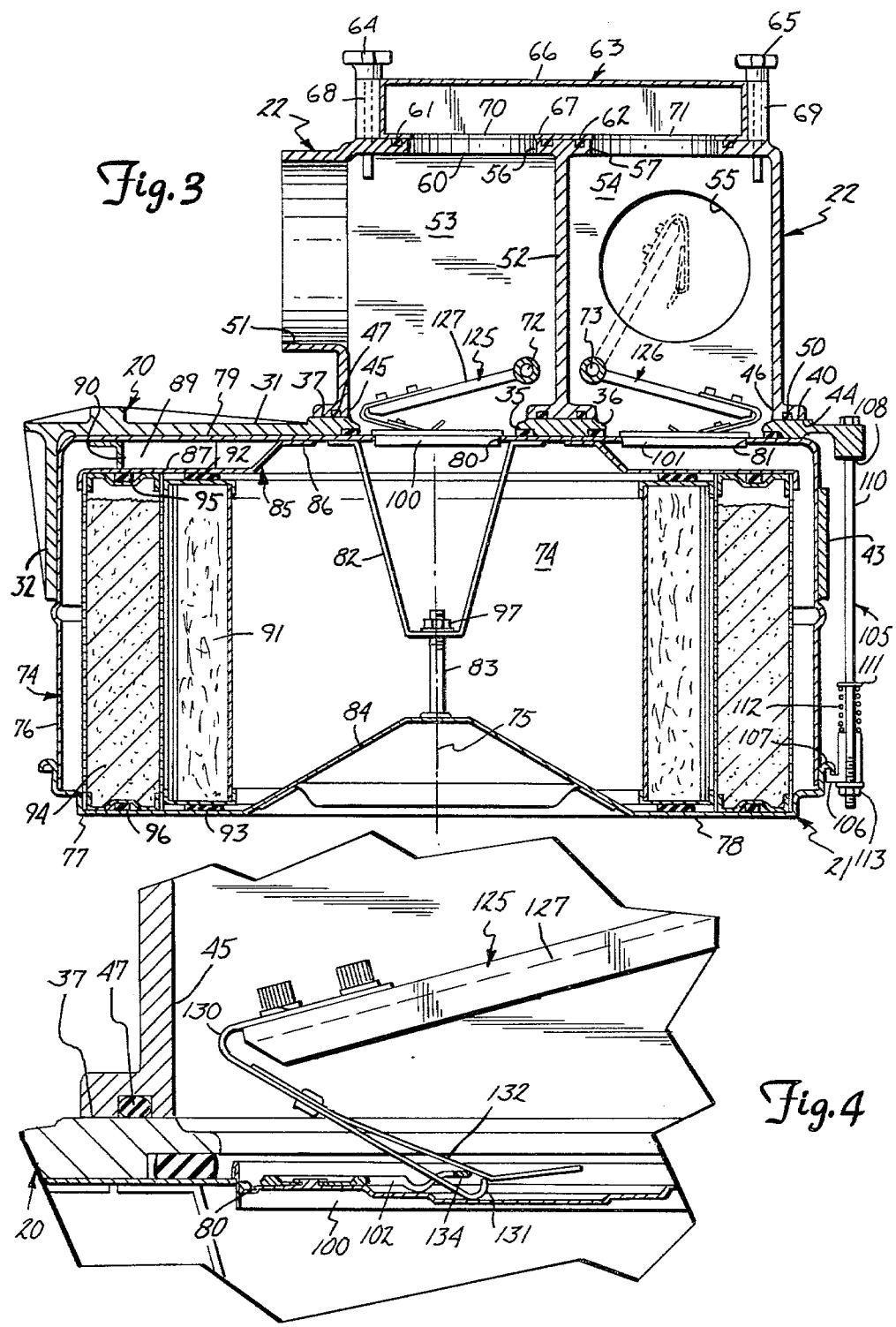

AIR PURIFIER WITH HERMETIC SEALING

TECHNICAL FIELD

This invention relates to the field of environmental protection, and particularly to apparatus for supplying air of acceptable purity to an enclosed space from an ambient atmosphere which may become polluted with noxious gaseous, biological, or particulate contaminants.

BACKGROUND OF THE INVENTION

There are occasions where an isolated enclosed space must be used even though the atmosphere ambient to the space becomes polluted with contaminants noxious to personnel or damaging to equipment in the space. It is known in such situations to maintain the atmosphere in the space at a pressure higher than ambient, and to supply air to the space through filtering equipment designed to remove the contaminant. It often happens that for long intervals the ambient air is free from contaminants, yet the possibility is present that contaminants may appear on very short notice, and for the sake of security all air admitted to the space is continuously purified. For completeness the purifier must include an adsorptive filter such as one using activated charcoal, and it is well known that for numerous gaseous pollutants the efficacy of activated charcoal is lessened and eventually destroyed by the action of water vapor, present in all ambient atmospheres. Thus even though no specific demand for adsorptive filtering has arisen, filters must nevertheless be periodically discarded and replaced simply as a precautionary measure.

A partial solution lies in retaining the adsorptive filters in the hermetic wrappings in which they are supplied by the manufacturers, but this involves the need to locate the filter, unwrap it, and rapidly install it properly under the stress of emergency conditions, and is not practically acceptable.

BRIEF SUMMARY OF THE INVENTION

The present invention comprises an air purifier having installed therein a canister containing the filter hermetically sealed, and further having means for rupturing the hermetic seal and establishing flow of air through the filter by a simple, rapid operation. By this means the filter remains in ready condition for days, months, even years, and yet is rendered operative almost instantly when the need arises. A feature of the invention is that means are also provided to enable use of the apparatus for ventilating the space by bypassing the filter, when the ambient air is of acceptable purity for that purpose.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals indicate corresponding parts throughout the several views.

FIG. 3 is an enlarged sectional view taken along line 3—3 of FIG. 1;

FIG. 4 is a further enlarged fragmentary view of one of the activators shown in FIG. 3;

DETAILED DESCRIPTION OF THE PREFERRED EMBODIMENT

Figure 1:
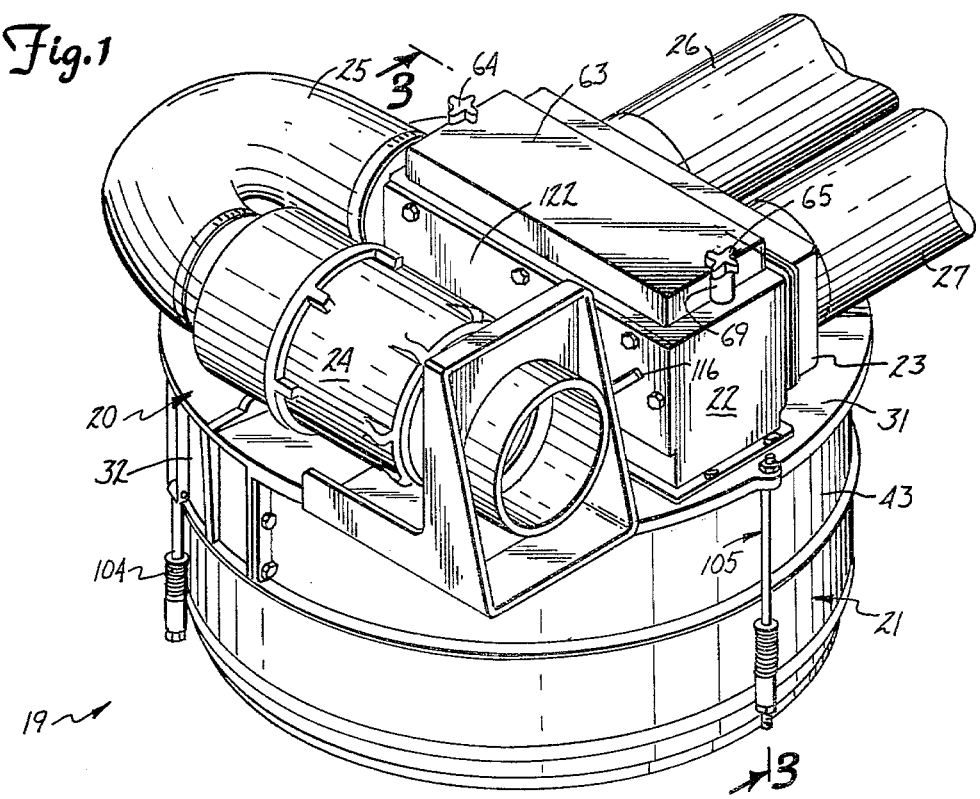
FIG. 1 is a perspective view of an air purifier according to the invention.

An air purifier 19 according to the invention is shown in FIG. 1 to comprise a support 20 arranged for receiving a filter canister 21 and having an inlet plenum 22 and an outlet plenum 23. An auxiliary air mover or coaxial fan 24 is mounted on support 20 and supplies air to inlet plenum 22 through a conduit 25. Air from the purifier is supplied through outlet plenum 23 to conduits 26 and 27.

Figure 2:
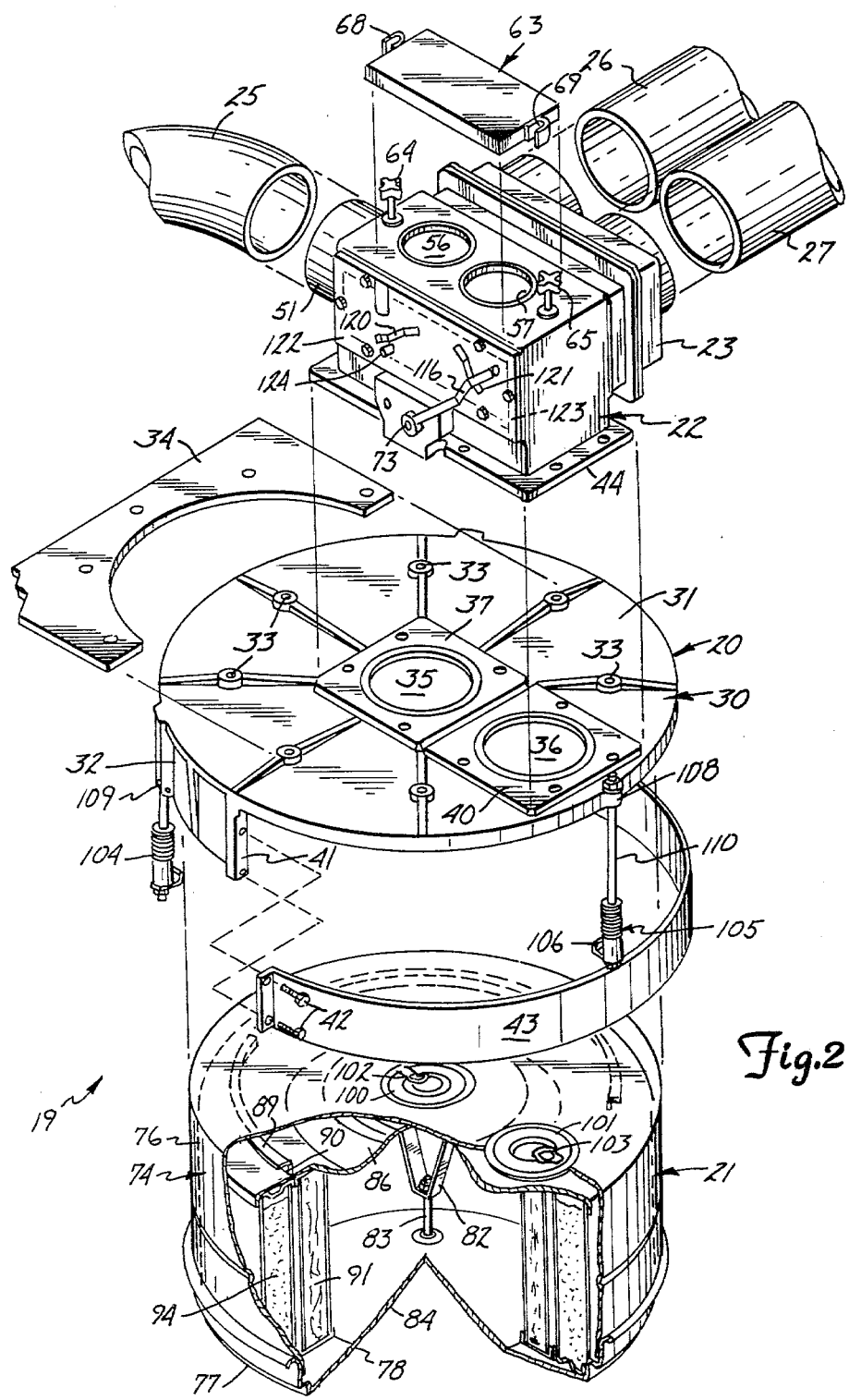
FIG. 2 is an exploded perspective view of the air purifier, portions thereof being broken away.

Referring now to FIG. 2, the support 20 conveniently comprises a casting 30 having a generally flat circular end 31 and a curved wall 32 extending therefrom. The circular end 31 is ribbed for strength and includes a plurality of tapped holes 33 to receive fasteners for mounting the support on a bracket 34, which may be positioned in any orientation. The casting 30 includes a large axial opening 35 and a similar paraxial opening 36 spaced radially therefrom. These openings 35, 36 are surrounded by flat pads 37, 40 respectively for mounting plenum 22. The wall 32 is generally semi-circular. Its ends 41 are arranged to accept fasteners 42 for a band clamp 43 by which the canister 21 is secured in the support 20.

The inlet plenum 22 is generally in the form of a box having a first flat surface 44 with openings 45 and 46, as can be seen in FIG. 3, sized and positioned to accord with openings 35, 36 in support 20, and surrounded by gasket rings 47, 50 respectively for sealing against the pads 37, 40. See FIG. 4. An inlet opening 51 is provided at one end of plenum 22, and a partition or barrier 52 divides the plenum into an inlet chamber 53 and an outlet chamber 54. The outlet chamber 54 has a lateral outlet opening 55 communicating with the outlet plenum 23.

Referring again to FIG. 2, a pair of further openings 56, 57 is provided in the face 60 of the inlet plenum 22. The plenum face 60 is opposite the first surface 44. As can be seen in FIG. 3, the openings 56, 57 are located on opposite sides of the partition 52, and are surrounded by gasket rings 61, 62 respectively for sealing engagement with a bypass member 63 which is secured against the inlet plenum 22 by clamp screws 64 and 65. The bypass member 63 comprises a relatively shallow closed box having opposite surfaces 66, 67 either of which may be positioned against the face 60 of the inlet plenum 22. The upper surface 66 is imperforate, while the lower surface 67 has a pair of openings 70, 71, sized and positioned to mate with openings 56, 57 in the plenum 22. The ends 68, 69 of the bypass member 63 are each configured to accept a screw 64, 65 respectively. A pair of shafts 72, 73, as shown in FIG. 3, extend transversely across the chambers 53, 54 for a purpose presently to be described.

Referring now to FIGS. 2 and 3, the canister 21 comprises a housing 74 having an axis 75 and including a container 76 and an end cap 77. The container 76 has a bottom 78, and a top wall member 79. The top wall member 79 has an axial aperture 80 and a paraxial aperture 81 sized and positioned in accordance with the openings 35, 36 in the casting 30. A first mounting bracket 82 is secured to the inner surface of the container top wall member 79. The bracket extends downwardly and is designed to receive a stud 83 which is attached to the inwardly dished inner surface 84 of the end cap 77, to draw the container 76 and the end cap 77 together. A baffle 85 has a radially inward portion 86, sealed to the inside of the top wall member 79 to surround the axial opening 80, and a radially outward portion 87. The outward portion 87 is spaced from the top wall member 79 by a plurality of arcuate bracketes 89 secured to the top wall member 79 and designed to contact the baffle 85 at its periphery. The brackets are spaced apart peripherally to provide radial air passages 90 therebetween.

The canister 21 includes a pair of hollow cylindrical filters 91, 94 positioned coaxial about the axis 75 for traversal radially outwardly by the air which is to be treated. The inner filter 91 is to remove particulate matter, and is of pleated paper: it is sealed against the baffle 85 and the end cap 77 by a pair of gaskets 92, 93 respectively. The outer filter 94 is an adsorptive filter of material such as activated charcoal, for removal from the air of noxious gaseous impurities: it is sealed against the baffle 85 and the end plate 77 by a pair of gaskets 95, 96 respectively.

To assemble the canister, the filters 91, 94 are placed in the container 76 with the gaskets 92, 95 bearing against the baffle 85, the gaskets 93, 96 are properly placed, and the end cap 77 is positioned so that the stud 83 passes through the bracket 82. A nut 97 is then tightened by a tool passed through the axial opening 80. The end cap 77 is then soldered to the container 76 around its entire periphery. This assembly then provides only one path for air flowing in at the axial opening 80, and that is radially outward through the filters 91, 94 into the space between the outer filter 94 and the housing 74, then axially upward, and finally through the spaces 90 between the brackets 89 to the paraxial opening 81.

Figure 7:
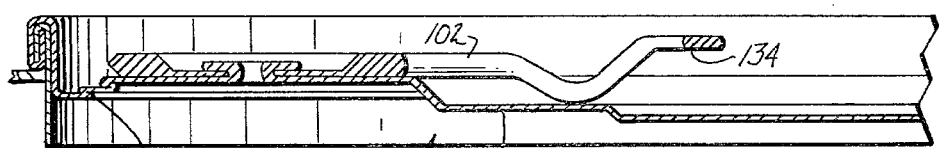
FIG. 7 is an enlarged fragmentary sectional view taken along line 7—7 of FIG. 6.
Figure 6:
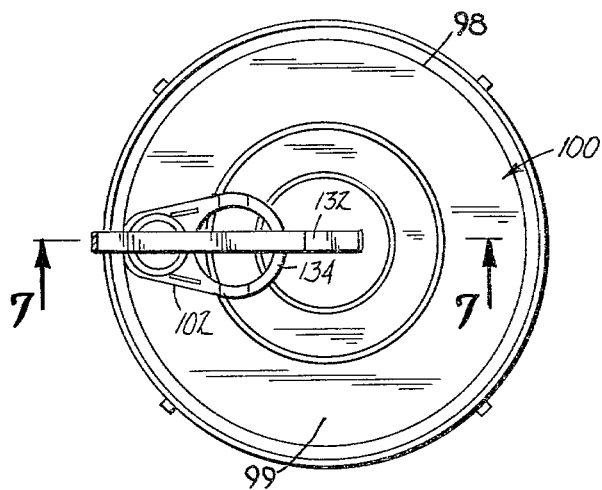
FIG. 6 is a top plan view of a closure member.

At this point the canister is now hermetically enclosed except for the canister openings 80, 81. These openings are next sealed by closures 100, 101, like the familiar pop-top closures used, for example, in marketing items such as snack foods. Examples of the state of the art for such closures are illustrated in the following patents: U.S. Pat. No. 4,044,915, issued Aug. 30, 1977 to La Croce et al.; U.S. Pat. No. 3,670,919, issued June 20, 1972 to Prayer et al.; and U.S. Pat. No. 3,643,833, issued Feb. 22, 1972 to Fraze et al. In the preferred embodiment of the invention, as shown in FIGS. 6 and 7, the easy-open closures 100, 101 are soldered around their peripheries into the openings 80, 81 respectively, with respective pull tabs or gripping rings 102, 103 extending toward one another along a radius from axis 75, as can be seen in FIG. 3. A peripheral score line 98 defines a central portion 99 which is removed when sufficient force is exerted upon the pull tab to rupture the seal existing between the openings 80, 81 and their respective score lines. However, prior to destroying the hermetic seal, the canister 21 can be stored indefinitely without deterioration.

It is preferable that a usable filter canister 21 be in the support 20 at all times, ready for immediate use if the atmosphere ambient to the inlet 51 becomes noxious. To accomplish this a canister is inserted into the support with the closures 100, 101 aligned with the inlet plenum openings 80, 81. Suitable optical indications or mechanical interlocks are provided to ensure this orientation. A plurality of latches 104, 105 (see FIGS. 1 and 3), are spaced around the periphery of the support 20 and include hooks 106 for engaging the out-turned rim 107 of the end cap 77: the hooks 106 slide on threaded shafts 110 having stop collars 111 against which compression springs 112 bear at first ends. The opposite ends of the springs 112 bear against the hooks 106. When the nuts 113 are tightened on the shafts 110, the canister 21 is drawn into tight sealing contact with the support 20. The band clamp 43 may then be secured by fasteners 42 to hold the canister 21 even more securely in the support 20. The shafts 110 may be connected to the support 20 either rigidly, as shown at 108 in FIG. 3, or pivotally, as shown at 109 in FIGS. 1 and 2.

It will be clear that even though the canister 21 is hermetically sealed, a first bypass path for airflow around the partition 52 nevertheless extends from the inlet 51 through the chamber 53, into the bypass member 63, to the chamber 54 and then to the outlet opening 55. If desired the fan 24 may be used for vantilation purposes independently of the filters.

Figure 5:
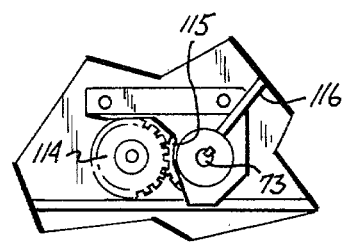
FIG. 5 is a fragmentary view, portions broken away, showing the activator gears.

The arrangement by which the canister 21 is quickly made operable will now be explained. Refer now to FIGS. 3 and 5. The shafts 72 and 73 are interconnected outward of the plenum 22 by a pair of meshing pinions 114, 115. The shaft 73 carries an actuating arm 116 to which is connected an actuating pull cord (not shown). The arm 116 is retained in either of two positions by a pair of spring detents 120 and 121 (see FIG. 2) secured to the access cover 122 placed over an opening 123 in the plenum 22. A solid stop member 124 is also provided. Inside the plenum 22 the shafts 72, 73 carry respective actuators 125, 126 for rupturing the closures 100, 101 and giving access to the filters 91, 94 in the canister 21.

Figure 9:
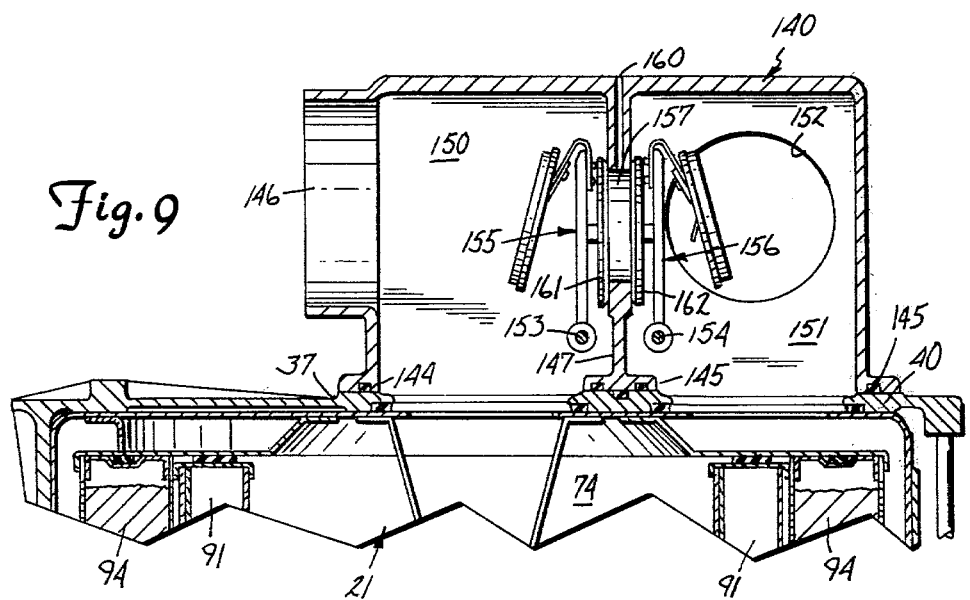
FIG. 9 is a view like FIG. 8, showing an alternate portion of the activators.

From FIG. 4 the construction of the actuators can be understood. Only one actuator 125 is shown, and comprises, as does the other actuator, a substantially rigid arm 127 secured to the shaft 72 and carrying at its end a hook 130, with a distal curved end 131 and a retainer 132 adjacent the curved end 131. When the arm 116 is in a first position shown in FIGS. 1 and 2, the actuators 125, 126 are as shown in FIG. 3. With the actuators in this position, the mounting of canister 21 in the storage and use position of FIG. 3 causes the hook 130 to engage the top of the closure 100 so that the curved end 131 of the hook slides into and through the loop 134 of the pull tab 102, with the retainer 132 passing over the loop to enable this movement. Alternatively, with the canister 21 locked in place, the arm 127 can be rotated to cause the curved end 131 of the hook 130 to pass through the loop 134, engage the surface of the closure 100, and slide under the pull tab 102, while the retainer slips over the pull tab as shown. Reverse operation of the arm 116 then causes the hook 130 to lift the pull tab 102, first breaking the seal and then tearing the closure along its score line 98 which is a weakened perimeter. At the same time the actuator 126 similarly opens the closure 101 so that access if free to the inner and outer surfaces of the filters 91, 94. As illustrated by broken lines in FIG. 3, the central portion 99 of the closure is removed and remains suspended on the hook 130 by its pull tab, being held there by the retainer 132. It will be appreciated by those familiar with the poptop closure art that upon removal the central portion 99 may curve or flex in upon itself. For purposes of illustration only, the removed central portion 99 is shown in FIG. 9 as remaining substantially flat and rigid after its removal. Also, screws 64, 65 are loosened and the bypass member 63 is inverted. The upper bypass openings 56, 57 are thus occluded. The only path for airflow from the inlet opening 51 to the outlet opening 55 is through the filters 91, 94, an alternate bypass around the partition 52.

The embodiment of the invention above described requires two distinct operations for transformation from a "ready" state to an "operating" state: not only must the arm 116 be moved to cause the actuators 125, 126 to engage and open the closures 100, 101, but the bypass member 63 must also be inverted. Neither of these operations is sufficient by itself to convert the air purifier to an "operating state". A second embodiment of the invention modifies the inlet plenum so that only operation of the arm 116 is required, all portions of the apparatus other than the inlet plenum being as previously described.

Figure 8:
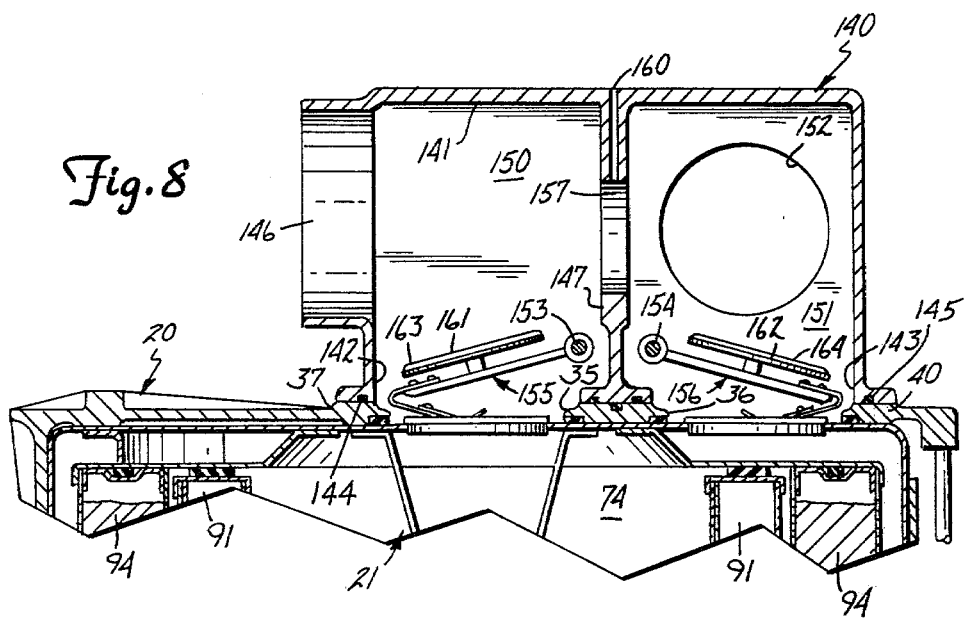
FIG. 8 is a sectional view similar to FIG. 3 showing an alternate embodiment of the invention.

In FIGS. 8 and 9, a modified inlet plenum 140 has generally the form of a box having a first flat surface 141 with openings 142, 143, sized and positioned to accord with the openings 35, 36 in the support 20, and each being surrounded by gasket rings 144, 145 respectively for sealing against the pads 37, 40. An inlet opening 146 is provided at one end of the plenum 140, and a partition or barrier 147 divides the plenum into an inlet chamber 150 and an outlet chamber 151, the latter having a lateral outlet opening 152 communicating with the outlet plenum 23.

A pair of shafts 153 and 154 extend transversely across respective chambers 150, 151 and also included are meshing pinions 114, 115 and an actuating arm 116 as shown in FIG. 5 to enable the operation of the actuators 155, 156 to remove the closures 100, 101 as described above.

The partition or barrier 147 has a large central opening 157, connected by a bleed hole 160 with the exterior of plenum 140. The actuators 155, 156 differ from the actuators 125, 126 previously described in that they carry valving discs 161, 162 each having sealing rings 163, 164, respectively. In a first position of the shafts 153, 154, the barrier opening 157 is not occluded, and air may flow freely from the inlet opening 146 through the barrier opening 157 to the outlet opening 152. In a second position of the shafts 153, 154, the discs 161, 162 occlude the barrier opening 157 on both sides of the partition or barrier 147, with any slight leakage past the rings 163, 164 being vented to ambience through the bleed hole 160.

The actuators 155, 156 are provided with hooks and retainers as described above, and function similarly to remove the closures 100, 101 of the canister 21. Thus, when the opening 157 of the partition 147 has been sealed by the valving discs 161, 162, as shown in FIG. 9, incoming air must flow through axial opening 80, into the canister 21, axially outward through the filters 91, 94, into the space between the outer filter 94 and the housing 74, axially upward and then through the spaces 90 between the brackets 89, and on to paraxial opening 81. The filtered air then exits the outlet chamber 151 through the opening 152 and is carried by the conduits 26, 27 to a location where the air may be safely inhaled.

From the foregoing it can be appreciated that the present invention provides an air purifier which is hermetically sealed until filtration of the air is necessary. The present invention also prevents degradation of the filter when filtration is not required. Furthermore, either ventilation of the ambient air or of filtered air may be provided as the situation warrants. The filters are disposable and thus minimize any potential decontamination problems.

The foregoing disclosure is illustrative only, and changes may be made in detail, especially in matters of shape, size, and arrangement of parts, within the principle of the invention, to the full extent indicated by the broad general meaning of the terms in which the appended claims are expressed.

What is claimed is:

1. An air purifying apparatus comprising:
   (a) an air inlet chamber including inlet means for introducing air flow into said inlet chamber;
   (b) an air outlet chamber, juxtaposed said air inlet chamber, including outlet means for releasing air from said outlet chamber;
   (c) an air flow barrier defining a common wall of said inlet and outlet chambers positioned between said air inlet means and said air outlet means, said barrier being a solid member constructed and arranged to direct an air flow in a first bypass path through said chambers;
   (d) means mounted adjacent said air inlet chamber and said air outlet chamber for adsorptive filtering of an air flow;
   (e) means for hermetically sealing said filtering means;
   (f) means mounted intermediate said filtering means and said air inlet and outlet chambers, for destroying said hermetic sealing means so as to define a second air flow path through said chambers via said filtering means, said means having a first position and a second position and being actuatable therebetween, said means in said first position occluding air flow through said filtering means, and said means in said second position destroying said hermetic sealing means;
   (g) a bypass member positioned generally above said air inlet chamber and said air outlet chamber, said member being in fluid communication with said air inlet means and said air outlet means when said means for destroying said hermetic sealing means is in said first position so as to partially define said first bypass path; and
   (h) means for occluding the fluid communication between said bypass member and said air inlet and outlet means when said means for destroying said hermetic sealing means is in said second position.

2. The apparatus in accordance with claim 1 wherein said filtering means includes a filter canister having an adsorptive filter disposed therein, said canister including portions with openings therein, said openings being constructed and arranged to be in fluid communication with said air inlet and outlet chambers when said means for destroying said hermetic sealing means is in said second position.

3. The apparatus in accordance with claim 2 wherein said sealing means includes closure means fixed in sealing relation to each filtering means opening, said closure means including a pull tab which is actuatable by said means for destroying said hermetic sealing means, said pull tab being removed when said means for destroying said hermetic sealing means is actuated from said first position to said second position.

4. The apparatus in accordance with claim 1 wherein said air inlet chamber and said air outlet chamber each include a portion with an opening therein, said openings being in fluid communication with each other and said bypass member so as to define said first bypass path.

5. The apparatus in accordance with claim 4 wherein said bypass member includes portions with apertures therein, said apertures being aligned with a respective chamber opening.

6. An air purifying apparatus comprising:
 (a) an air inlet chamber including inlet means for introducing air flow into said inlet chamber;
 (b) an air outlet chamber, juxtaposed said air inlet chamber, including outlet means for releasing air from said outlet chamber;
 (c) an air flow barrier defining a common wall of said inlet and outlet chambers and positioned between said air inlet means and said air outlet means, said barrier having an opening therein arranged to direct air flow in a first bypass path through said chambers;
 (d) means mounted adjacent said air inlet chamber and said air outlet chamber for adsorptive filtering of an air flow, said filtering means including a first opening and a second opening, said first opening being positioned proximate said air inlet means, said second opening being positioned proximate said air outlet means;
 (e) means for hermetically sealing said openings in said filtering means;
 (f) means, mounted intermediate said filtering means and said air inlet and outlet chambers, for destroying said hermetic sealing means so as to define a second air flow path through said chambers via said filtering means, said means having a first position and a second position and being actuatable therebetween, said means in said first position occluding air flow through said filtering means, and said means in said second position destroying said hermetic sealing means by removal of said sealing means from each opening of said filtering means; and
 (g) means for occluding air flow through said barrier opening when said means for destroying said hermetic sealing means is in said second position.

7. The apparatus according to claim 6 wherein said sealing means includes a pair of closures each being fixed in sealing relation with a respective filtering means opening, each closure having a pull tab which is actuatable by said means for destroying said hermetic sealing means, said pull tab being removed when said means for destroying said hermetic sealing means is actuated from said first position to said second position, thereby destroying said sealing relation and allowing air flow along said second air flow path through said filtering means, and said means for occluding air flow through said barrier opening including valving means connected to said sealing means, said valving means being positioned in said respective air inlet and air outlet chambers in a manner to close said barrier opening and prevent air flow along said first bypass path when said means for destroying said hermetic sealing means is in said second position.

8. An air purifier comprising, in combination:
 a housing having an air inlet, an air outlet, a barrier between said inlet and said outlet, first upper bypass openings on opposite sides of said barrier, and second lower bypass openings on opposite sides of said barrier;
 a bypass plenum mounted on said housing and including means for enabling a first flow path for air flow between said upper bypass openings, and means for disabling said first air flow path;
 a filter canister positioned generally below said housing, said filter canister including a filter and having portions containing an inlet aperture and an outlet aperture, each aperture located adjacent one of said second lower bypass openings, said apertures and said openings allowing fluid communication between said filter canister and said housing for air flow through said filter and closure means at said apertures for preventing air flow through said filter canister,
 and means for removing each of said closure means from said apertures to allow air flow through said filter.

9. The air purifier according to claim 8 wherein said closure means comprises sheet metal members sealing peripherally said apertures, and pull tabs secured thereto for removing said members from said apertures.

10. The air purifier in accordance with claim 8 wherein said bypass plenum enabling means includes a wall containing portions with apertures therein, said apertures normally being in fluid communication with said first upper bypass openings.

11. The air purifier in accordance with claim 8 wherein said bypass plenum disabling means includes a solid wall member constructed and arranged to prevent entry of air flow into said plenum through said first upper bypass openings.

12. An air purifier comprising, in combination:
 (a) a housing having an air inlet, an air outlet, a barrier between said inlet and said outlet, said barrier having a portion with an opening therein, and a pair of bypass openings positioned on opposite sides of said barrier;
 (b) a filter canister positioned adjacent said housing, said canister including a filter, portions of said canister being adjacent said pair of bypass openings and containing an inlet aperture and an outlet aperture for allowing air flow between said housing and said filter canister, and closure means secured to each of said apertures for normally preventing air flow through said filter canister, said closure means comprising sheet metal members peripherally sealing said apertures and pull tabs secured to said sheet metal members for destroying said peripheral sealing and removing said members from said apertures;
 (c) means for securing said filter canister to said housing, said canister apertures being aligned with a respective housing bypass opening;
 (d) means mounted to said housing for activating said pull tabs; and
 (e) valve means mounted on said closure means for simultaneously closing said barrier opening when said sheet metal members are removed from said apertures.

* * * * *